US010282327B2

(12) United States Patent
Farrell et al.

(10) Patent No.: US 10,282,327 B2
(45) Date of Patent: May 7, 2019

(54) TEST PENDING EXTERNAL INTERRUPTION INSTRUCTION

(71) Applicant: INTERNATIONAL BUSINESS MACHINES CORPORATION, Armonk, NY (US)

(72) Inventors: Mark S. Farrell, Pleasant Valley, NY (US); Dan F. Greiner, San Jose, CA (US); Jeffrey P. Kubala, Poughquag, NY (US); James H. Mulder, Poughkeepsie, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 15/409,592

(22) Filed: Jan. 19, 2017

(65) Prior Publication Data

US 2018/0203814 A1 Jul. 19, 2018

(51) Int. Cl.
| G06F 13/26 | (2006.01) |
| G06F 9/48 | (2006.01) |
| G06F 9/30 | (2018.01) |

(52) U.S. Cl.
CPC .......... *G06F 13/26* (2013.01); *G06F 9/30003* (2013.01); *G06F 9/30076* (2013.01); *G06F 9/4831* (2013.01)

(58) Field of Classification Search
CPC ............................. G06F 12/0246; G06F 13/24
USPC ....................................................... 710/263
See application file for complete search history.

(56) References Cited

U.S. PATENT DOCUMENTS

| 4,342,082 | A | 7/1982 | Brown et al. |
| 5,222,215 | A * | 6/1993 | Chou .................... G06F 9/4812 710/262 |
| 7,543,095 | B2 | 6/2009 | Belmar et al. |
| 9,158,547 | B2 | 10/2015 | Barry et al. |
| 2004/0117532 | A1 | 6/2004 | Bennett et al. |
| 2008/0046623 | A1* | 2/2008 | Belmar ............... G06F 9/45537 710/266 |
| 2008/0270775 | A1 | 10/2008 | Lundvall et al. |
| 2011/0072250 | A1* | 3/2011 | Barry .................... G06F 9/3861 712/234 |
| 2011/0078421 | A1 | 3/2011 | Greiner et al. |

(Continued)

FOREIGN PATENT DOCUMENTS

EP 0223413 B1 10/1986

OTHER PUBLICATIONS

International Search Report and Written Opinion for PCT/EP2018/050180 dated Apr. 12, 2018, pp. 1-10.

(Continued)

*Primary Examiner* — Titus Wong
(74) *Attorney, Agent, or Firm* — Steven Chiu, Esq.; Blanche E. Schiller, Esq.; Heslin Rothenberg Farley & Mesiti P.C.

(57) ABSTRACT

Testing for pending external interruptions. A Test Pending External Interruption instruction tests for pending external interruptions. The test for pending external interruptions is based on one or more program-specified subclasses, regardless of whether the machine is enabled for those classes of interruption. The instruction provides an indication for those subclasses being tested of whether there are any pending external interruptions for those subclasses.

20 Claims, 5 Drawing Sheets

(56) References Cited

U.S. PATENT DOCUMENTS

| | | | | |
|---|---|---|---|---|
| 2011/0320664 A1* | 12/2011 | Belmar | ................ | G06F 9/4812 |
| | | | | 710/269 |
| 2012/0226942 A1* | 9/2012 | Gangasani | .............. | G06F 11/27 |
| | | | | 714/30 |
| 2015/0269117 A1 | 9/2015 | Gainey et al. | | |

OTHER PUBLICATIONS

IBM, "z/Architecture—Principles of Operation," SA22-7832-10, Eleventh Edition, Mar. 2015, pp. 1-1732.
IBM, "Power ISA—V2.07B," Apr. 9, 2015, pp. 1-1527.
Anonymously, "System and Method to Discard and Report Over-Initiative Thin Interrupts Allowed by the Queued I/O Devices," IP.com No. 000199672D, Sep. 14, 2010, pp. 1-9 (+ cover).
Anonymously, "Method to Provide a Generalized External Interrupt Model in the EFI Framework," IP.com No. 000016690D, Jul. 9, 2003, pp. 1-4 (+ cover).
Anonymously, "Crash-Consistent Clustered Storage System's Minimal Instruction Set Logging," IP.com No. 000245057D, Feb. 6, 2016, pp. 1-3 (+ cover).

* cited by examiner

TEST PENDING EXTERNAL INTERRUPTION INSTRUCTION

BACKGROUND

One or more aspects relate, in general, to processing within a computing environment, and in particular, to improving such processing.

Computing environments often offer a mechanism to provide an interrupt to alter the processing sequence within a computing environment. An interrupt (also referred to as an interruption) is a signal to the operating system or processor, as examples, to temporarily stop executing a particular program to perform another task. As an example, one type of interrupt, an external interrupt, causes a currently running program to be suspended, in order to execute a higher priority operating system subroutine to handle the interrupt. The interruption mechanism in the central processing unit forces a branch out of the current program to a selected subroutine for other processing. After the interrupt is completed, the suspended program may be resumed.

This type of processing may also occur for other types of interrupts.

SUMMARY

Shortcomings of the prior art are overcome and additional advantages are provided through the provision of a computer program product for facilitating processing within a computing environment. The computer program product comprises a storage medium readable by a processing circuit and storing instructions for performing a method. The method includes, for instance, obtaining an instruction to test for one or more pending external interrupts; and executing the instruction, the executing including: determining, based on information provided by the instruction, one or more external interruption subclasses to be tested; checking whether one or more external interruptions are pending for the one or more external interruption subclasses being tested; and indicating whether one or more external interruptions are pending for the one or more external interruption subclasses being tested.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects of the present invention, processing within a computing environment is facilitated by providing a capability to test for pending external interruptions. As used herein, the term "external interrupt" is an interrupt that originates from within a computer system having one or more processors (e.g., tightly coupled), but is external to a program. It is distinct from an input/output (I/O) interrupt that originates from an I/O device or a channel subsystem.

By determining if there is a pending external interruption, a control program, such as an operating system, can take action, which may include performing a task, or even avoiding or preventing a task from occurring, to facilitate processing within the environment. For instance, the control program may potentially accelerate the resolution of resource conflicts or dead-lock scenarios by avoiding certain actions. As examples, the control program may avoid performing a long-running service for a task whose time-slice is expiring, or avoid acquiring a lock when it has received a warning track interruption indicating that the operating system's logical processor is about to be undispatched by a hypervisor program. Other such examples exist.

The capability to test for pending external interruptions includes a Test Pending External Interruption instruction, which tests for pending external interruptions based on, for instance, one or more program-specified subclasses, regardless of whether the machine is enabled for those classes of interruption, as described further below.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, Mar. 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1A:
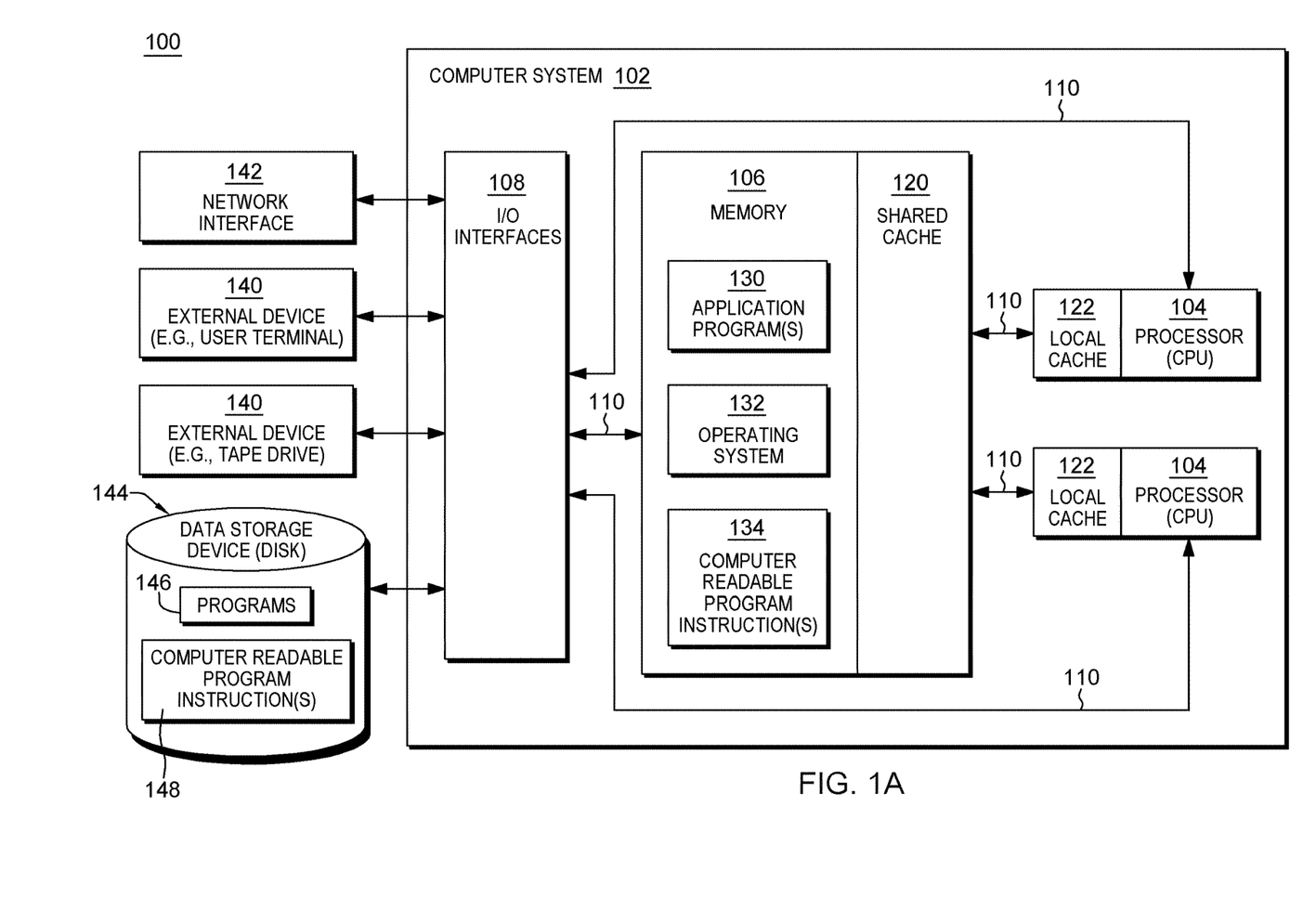
FIG. 1A depicts one example of a computing environment to incorporate and use one or more aspects of the present invention.

As shown in FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134. Computer readable program instructions 134 may be configured to carry out functions of embodiments of aspects of the invention.

Computer system 102 may also communicate via, e.g., I/O interfaces 108 with one or more external I/O devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
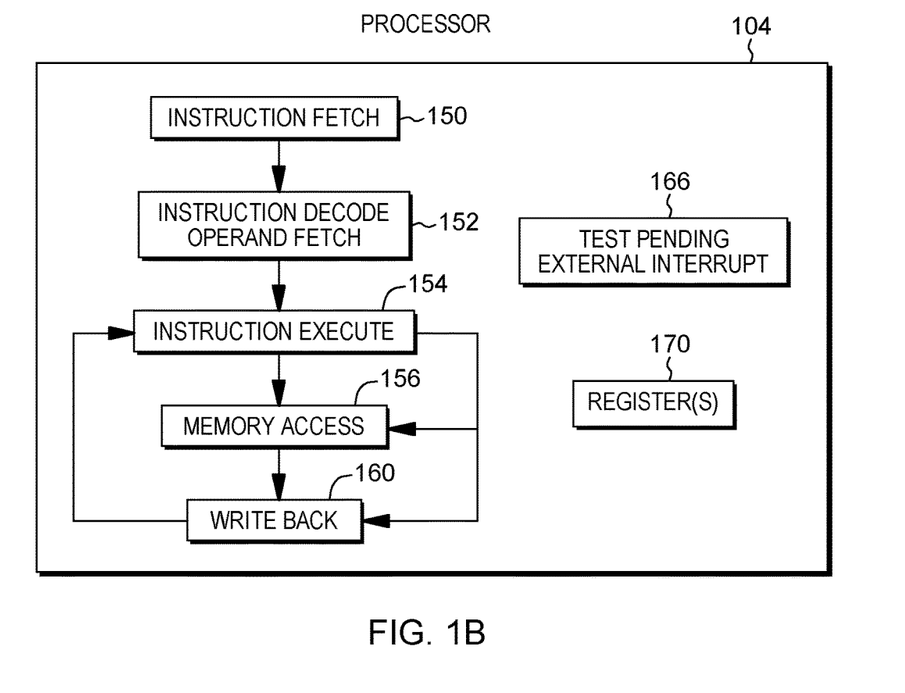
FIG. 1B depicts further details of the processor of FIG. 1A, in accordance with an aspect of the present invention.

Further details regarding one example of processor 104 are described with reference to FIG. 1B. Processor 104 includes a plurality of functional components used to execute instructions. These functional components include, for instance, an instruction fetch component 150 to fetch instructions to be executed; an instruction decode unit 152 to decode the fetched instructions and to obtain operands of the decoded instructions; instruction execution components 154 to execute the decoded instructions; a memory access component 156 to access memory for instruction execution, if necessary; and a write back component 160 to provide the results of the executed instructions. One or more of these components may, in accordance with an aspect of the present invention, be used to execute a Test Pending External Interruption instruction 166, described further below.

Processor 104 also includes, in one embodiment, one or more registers 170 to be used by one or more of the functional components.

Figure 2A:
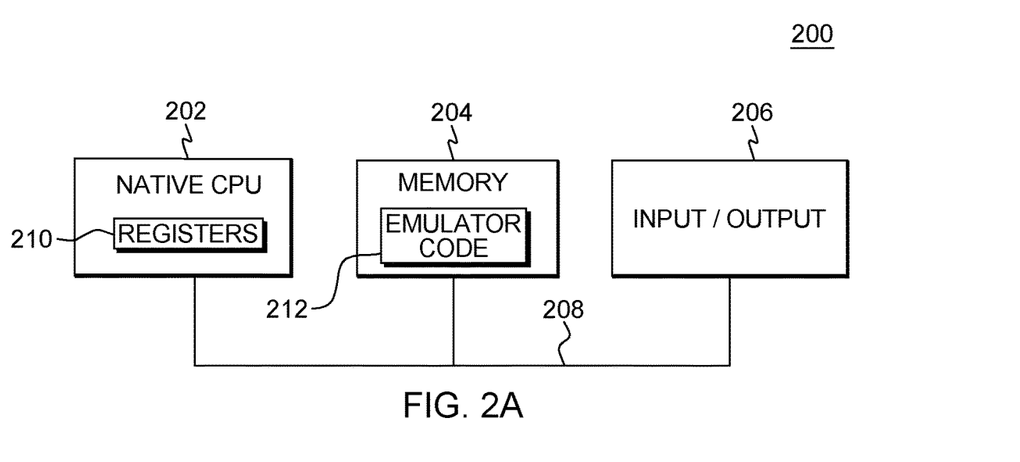
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a pSeries server offered by International Business Machines Corporation, Armonk, N.Y.; and/or other machines based on architectures offered by International Business Machines Corporation, or other companies.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, or other servers or processors, to emulate the z/Architecture and to execute software and instructions developed based on the z/Architecture.

Figure 2B:
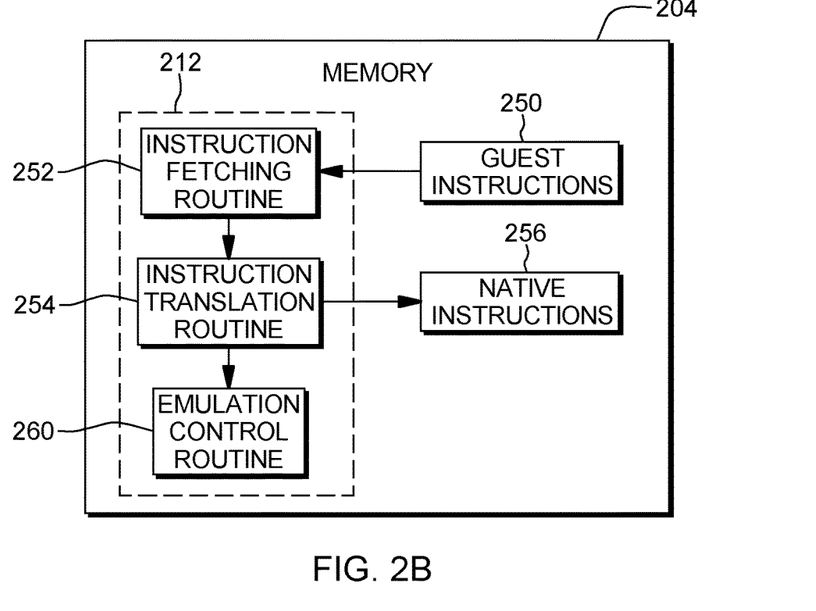
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor, but instead, are being emulated on native CPU 202, which may be, for example, an Intel processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 250 that is obtained, translated and executed is, for instance, a Test Pending External Interruption instruction, described herein. The instruction, which is of one architecture (e.g., the z/Architecture), is fetched from memory, translated and represented as a sequence of native instructions 256 of another architecture (e.g., PowerPC, pSeries, Intel, etc.). These native instructions are then executed.

In one embodiment, the Test Pending External Interruption instruction tests for selected pending external interruptions, based, e.g., on one or more program-specified subclasses provided by the instruction, regardless of whether the machine is enabled for that class or classes of interruption and without clearing a pending external interruption condition. There may be a number of reasons to test for pending external interrupts. As examples, the control program (e.g., operating system) may be operating disabled for interruptions for a variety of reasons, including, for instance, managing queues, such as interruption queues; dispatching tasks; etc. Further, in various cases, the control program may need to determine the efficacy of an action before attempting it. Such example actions include dispatching, in a virtual environment, a process that is holding a critical system lock when the hypervisor that manages virtual machines of the environment is about to undispatch the logical CPU (potential for lock time-outs); dispatching a process when there are high-priority interruptions pending that may interfere with the process (e.g., malfunction alert, emergency signal); etc. Thus, in accordance with an aspect of the present invention, a testing mechanism is provided to test for pending external interruptions. This mechanism includes, for instance, a Test Pending External Interruption instruction. In one embodiment, the Test Pending External Interruption instruction is a single architected machine instruction at the hardware/software interface.

Figure 3:
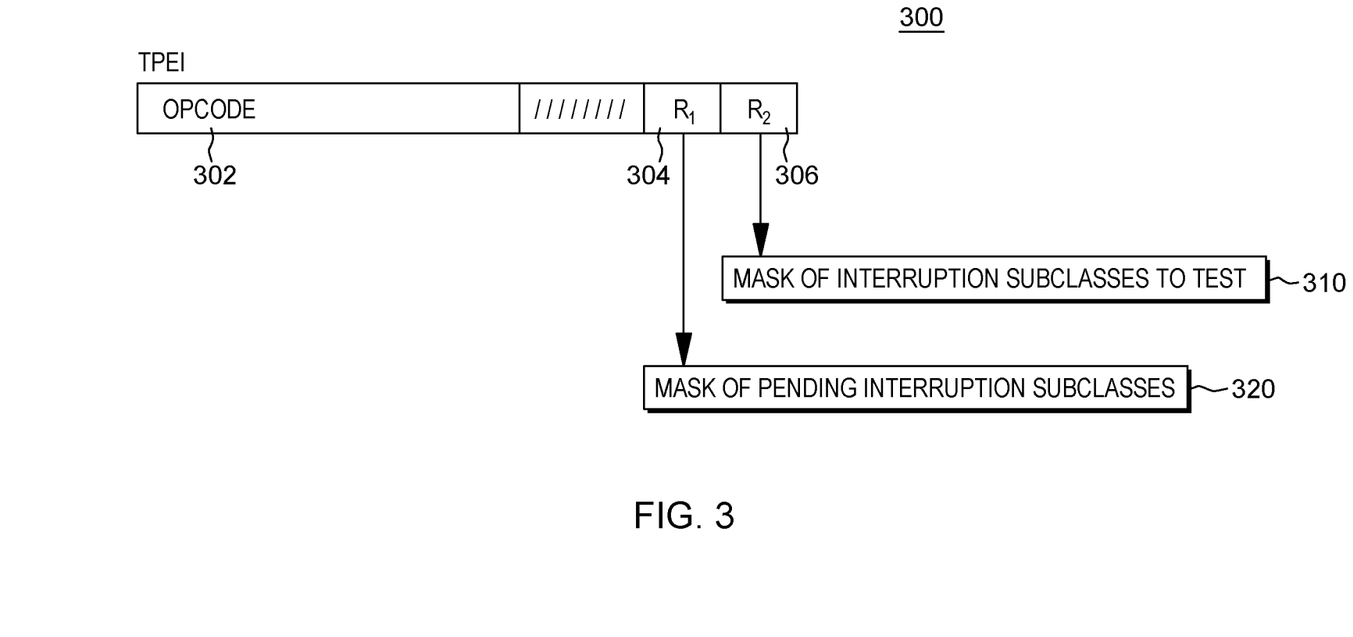
FIG. 3 depicts one example of a Test Pending External Interruption instruction, in accordance with an aspect of the present invention.

One example of a Test Pending External Interruption instruction is described with reference to FIG. 3. In one example, a Test Pending External Interruption (TPEI) instruction 300 includes an operation code (opcode) field 302 having an opcode to designate a test pending external interruption operation; a first register field ($R_1$) 304; and a second register field ($R_2$) 306. In one embodiment, the fields of the instruction are separate and independent from one another. However, in another embodiment, more than one field may be combined. Further, a subscript number associated with a field of the instruction denotes the operand to which the field applies. For instance, any field having a subscript 1 is associated with a first operand, any field having a subscript 2 is associated with a second operand, and so forth.

In one example, the register specified in $R_2$ 306 includes a mask 310 representing one or more external interruption subclasses that may be selected for testing for pending external interruptions. In one embodiment, these external interruptions originate from within a computer system having one or more processors (e.g., tightly coupled), but are external from a program, and are not from I/O devices or a channel subsystem. Example subclasses that may be selected for testing and associated example bit positions within the mask are shown below. In one embodiment, other bits in general register $R_2$ are reserved and are to contain zeros; otherwise, the program may not operate compatibility in the future.

Bit External Interruption Subclass
  30 Warning track interruption (e.g., used to warn a program (e.g., operating system) or processor that it has a grace period in which to perform a function (e.g., clean-up, etc.))
  48 Malfunction alert (e.g., used to warn a program or processor that another CPU in the configuration has experienced a malfunction (e.g., entered the checkstop mode or lost power))
  49 Emergency signal (e.g., used for high-priority inter-CPU signaling within a computer system)
  50 External call (e.g., used for inter-CPU signaling within a computer system)

Many other subclasses may be provided. In a further embodiment, one or more of the following subclasses may be selected for testing:

Bit Subclass
  52 Clock comparator (e.g., used to indicate that the current time-of-day clock has exceeded a pre-set comparand)
  53 CPU timer (e.g., used to indicate that a pre-set amount of CPU time has expired)
  54 Service signal (e.g., used to communicate with a logical service processor)
  57 Interruption key (e.g., used to indicate manual operator intervention)
  58 Measurement alert (e.g., used to indicate various changes in a CPU measurement facility)
  59 Timing alert (e.g., used to indicate various signals from an external time reference)
  Other possibilities also exist.

In one embodiment, for this instruction, an interruption is considered to be pending for a subclass regardless of whether the subclass is enabled in a selected control register, such as control 0, and regardless of the setting of a selected bit in another control register, such as a program status word (PSW), as further described herein. In one example, control register 0 is used to provide control information in the CPU. It includes indications for each of the subclasses listed above. In one example, the bit numbers listed above are the same bit numbers in the control register for the respective subclasses. When a bit in control register 0 is set, e.g., to one, the corresponding subclass is enabled. Further, in one example, the program status word is a control register that performs the functions of a status register and a program counter. It contains information used for proper program execution, including, but not limited to, a condition code, an instruction address, and other information. A selected bit, e.g., bit 7, of the PSW designates an external mask and controls whether the CPU is enabled for interruptions by conditions included in an external class, such as the conditions listed above, as examples.

As indicated above, in addition to the $R_2$ field, the Test Pending External Interruption instruction also includes $R_1$ field 304 that designates a general register having a mask 320 of pending interruption subclasses, i.e., a mask that indicates whether external interrupts are pending for the selected subclasses.

In one example operation of the Test Pending External Interruption instruction, if an external interruption is pending for a designated subclass, the corresponding bit in general register $R_1$ is set to, e.g., one; otherwise, the corresponding bit in general register $R_1$ is set to, e.g., zero. Other bit positions in general register $R_1$ are set to zeros, in one example.

When a resulting bit position in general register $R_1$ contains, e.g., a one, the instruction completes by setting condition code 1, as an example; otherwise, the instruction completes by setting condition code 0, as an example. In particular, based on execution, there may be one of the following resulting condition codes: 0 —None of the tested subclasses of external interruptions is pending, or no subclasses were tested; or 1 —one or more of the tested subclasses of external interruptions are pending.

Moreover, the following program exceptions may occur: operation (test pending external interruption facility not installed); privileged operation; and/or transaction constraint (the executing transaction is constrained).

In one embodiment, the Test Pending External Interruption instruction does not take subclass enablement into consideration. Further, in one embodiment for the z/Architecture, the defined bit positions in general registers $R_1$ and $R_2$ match the bit positions of the corresponding external interruption subclass enablement controls in, e.g., control register 0.

In a further aspect, the Test Pending External Interrupt instruction may be used in interpretive execution in, for instance, virtualized environments. In one embodiment, a hypervisor or host (e.g., z/VM) and processor (e.g., System z) hardware/firmware interact with each other in a controlled cooperative manner in order to process guest operating system operations without requiring the transfer of control from/to the guest operating system and the host. Guest operations can be executed directly without host intervention via a facility that allows instructions to be interpretatively executed for the guest, including a pageable storage mode guest. This facility provides an instruction, Start Interpretative Execution (SIE), which the host can issue, designating a control block, called a state description, which holds guest (virtual machine) state and controls, such as, for instance, indications of guest architectural mode, guest architectural features, guest registers, execution controls, and so forth. The SIE instruction places the machine into an interpretative execution mode in which guest instructions and interruptions are processed directly, until a condition requiring host attention arises. When such a condition occurs, interpretative execution is ended, and either a host interruption is presented, or the SIE instruction completes storing details of the condition encountered; the latter action is called interception. It is in this environment that the Test Pending External Interruption instruction may also be used.

For example, the Test Pending External Interruption instruction may be used to test for warning track interruptions which are available, in one embodiment, to guest configurations, and not non-guest configurations. Since the warning track facility is unavailable in non-guest configurations, in one embodiment, bit 30 of general register $R_1$ will not be set to, e.g., one for a configuration operating at host-level 0 (for example, the hypervisor). Other examples also exist.

In one example, interpretive execution of the Test Pending External Interruption instruction is subject to an execution control in the state description. In one embodiment, a selected bit, e.g., bit 3 of the execution control D (ECD) field of the state description, controls whether TPEI can be interpretively executed. If guest execution of TPEI is attempted, but ECD. 3 is not, e.g., one, then the guest execution is suppressed, and an instruction interception (e.g., code 4) condition is recognized.

Further, an intervention requests (V) field of the state description may be examined based on execution of the TPEI instruction. For instance, the warning track (T) and external call (X) bits (that is, bits 2 and 4 respectively) of the V field may be examined based on the bits corresponding to those subclasses (e.g., bits 30 and 50) being set in mask 310.

Moreover, a new intervention requests extended (VX) field is defined in the state description. Bits 0 and 1 of the VX field represent thread specific indications that a guest emergency signal interruption and guest malfunction alert interruption, respectively, are pending. These bits are set and reset by the host program, and examined based on the interpretive execution of TPEI. For instance, bits 0 and 1 of the VX field are examined based on, e.g., bits 49 and 48 being set in mask 310.

Other examples are also possible.

Figure 4:
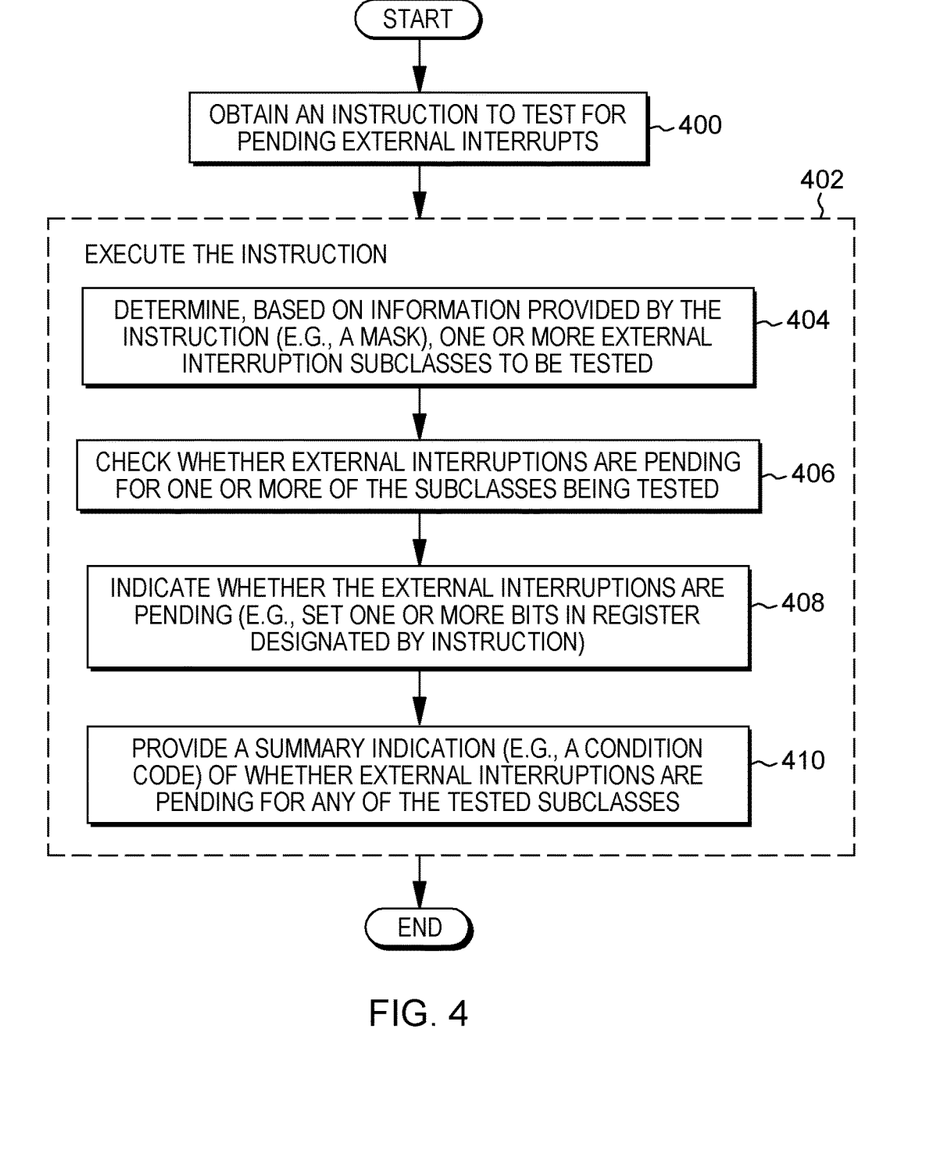
FIG. 4 depicts one example of processing associated with the Test Pending External Interruption instruction of FIG. 3, in accordance with an aspect of the present invention.

Further details regarding aspects of a Test Pending External Interruption instruction are described with reference to FIG. 4. In one example, an instruction to test for pending external interrupts, e.g., a Test Pending External Interrupt instruction, is obtained, STEP 400. This instruction is, in one example, a single architected instruction. The instruction is then executed by a processor, STEP 402.

The execution includes, for instance, determining, based on information provided by the instruction, one or more external interruption subclasses to be tested, STEP 404. For instance, a mask included in a register designated by $R_2$ of the instruction includes a plurality of indicators (e.g., a plurality of bits). One or more of the indicators correspond to one or more external interruption subclasses that may be selected for testing for pending external interruptions. For instance, one indicator (e.g., bit 30) corresponds to warning track interruptions; one indicator (e.g., bit 48) corresponds to a malfunction alert; one indicator (e.g., bit 49) corresponds to an emergency signal; and another indicator (e.g., bit 50) corresponds to an external call. If an indicator is set to a particular value, e.g., one, then the subclass corresponding to the set indicator is to be tested for pending external interruptions. For example, if bit 49 is set to one, then a test for pending external interruptions for emergency signals is performed. One or more indicators may be set.

For each set indicator, a check is made as to whether external interruptions are pending for the subclass corresponding to the set indicator, STEP 406. For instance, if bit 49 is set, a check is made as to whether external interruptions are pending for emergency signals, STEP 406. In one example, for this check, in the case where no interpretive execution applies, the CPU keeps track of whether there are pending external interrupts, and the CPU tests its pending interruption latches to determine if an interruption is pending.

Where interpretive execution applies, hardware interruptions are presented to the host, and the host determines whether they are targeted to the guest. If they are targeted to the guest, the host sets pending interruption bits in the guest's state description. If the guest is enabled for the class of interruption when it is dispatched, they are presented to the guest; otherwise, the interruption remains pending. When the guest program executes a TPEI instruction, the CPU (e.g., Millicode) examines the pending bits in the guest's state description in order to formulate a response.

If an external interruption is pending for a subclass that is tested, then an indication is provided as such, STEP 408. For instance, an indicator (e.g., a bit) in a mask provided in the register specified in $R_1$ that corresponds to the subclass being tested is set (e.g., to one). This same processing occurs for each tested subclass that has pending external interrupts.

Further, in one example, a summary indication indicating whether any of the tested subclasses of interruptions are pending is provided, for example, in a condition code. For example, if none of the tested subclasses of interruptions is pending, the condition code is set to 0; if any of the tested subclasses of interruptions are pending, the condition code is set to 1.

Described in detail herein is a Test Pending External Interruption (TPEI) instruction that determines whether one or more selected external interruptions are pending for the CPU executing the instruction. In one embodiment, TPEI determines whether one or more external interruptions are pending based on one or more specific subclasses; and it does so without clearing the one or more pending external interruptions. By testing for pending external interruptions, actions, including non-actions, may be taken to facilitate processing within a computing environment, improving performance thereof. The control program is able to determine if there is a pending interruption for a particular resource, while remaining disabled for that class of interruption. One or more aspects of the present invention are inextricably tied to computer technology and facilitate processing within a computer, improving performance thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, said computer program product comprising:
  a computer readable storage medium readable by a processing circuit and storing instructions for performing a method comprising:
    obtaining an instruction to test for one or more pending external interrupts, wherein an external interrupt is an interrupt that originates from within a computer system, external to a program, and is distinct from an input/output (I/O) interrupt originating from an I/O device; and executing the instruction, the executing including:
   determining, based on information provided by the instruction, one or more external interruption subclasses to be tested;
   checking whether one or more external interruptions are pending for the one or more external interruption subclasses being tested; and
   indicating whether one or more external interruptions are pending for the one or more external interruption subclasses being tested.

2. The computer program product of claim 1, wherein the determining comprises examining a mask provided in a location designated by the instruction to determine the one or more external interruption subclasses to be tested.

3. The computer program product of claim 2, wherein the mask includes a plurality of indicators for a plurality of external interruption subclasses, and an indicator of the plurality of indicators set to a defined value indicates that an external interruption subclass corresponding to the indicator is to be tested.

4. The computer program product of claim 3, wherein the plurality of external interruption subclasses comprises a warning track interruption, a malfunction alert, an emergency signal and an external call.

5. The computer program product of claim 2, wherein the location comprises a register designated by a field of the instruction.

6. The computer program product of claim 1, wherein the indicating comprises setting, for an external interruption subclass having a pending external interruption, an indicator in a location specified by the instruction.

7. The computer program product of claim 6, wherein the location is a register specified by a field of the instruction, and wherein the indicator is a bit in a mask in the register specified by the instruction.

8. The computer program product of claim 1, wherein the checking is performed while a control program of the computing environment is disabled for the one or more external interruption subclasses, and wherein the external interrupt is considered pending for an external interruption subclass regardless of whether the external interruption subclass is enabled.

9. The computer program product of claim 1, wherein the executing the instruction is performed regardless of whether a processor executing the instruction is enabled for interrupts.

10. The computer program product of claim 1, wherein the executing further includes providing a summary indication indicating whether one or more external interruptions are pending for the one or more external interruption subclasses being tested.

11. The computer program product of claim 1, wherein the instruction is a single architected instruction comprising an operation code specifying a test pending external interruption instruction, a first register field to be used in the indicating, and a second register field to be used in the determining.

12. A computer system for facilitating processing within a computing environment, said computer system comprising:
   a memory; and
   a processor in communication with the memory, wherein the computer system is configured to perform a method, said method comprising:
      obtaining an instruction to test for one or more pending external interrupts, wherein an external interrupt is an interrupt that originates from within a computer system, external to a program, and is distinct from an input/output (I/O) interrupt originating from an I/O device; and
      executing the instruction, the executing including:
         determining, based on information provided by the instruction, one or more external interruption subclasses to be tested;
         checking whether one or more external interruptions are pending for the one or more external interruption subclasses being tested; and
         indicating whether one or more external interruptions are pending for the one or more external interruption subclasses being tested.

13. The computer system of claim 12, wherein the determining comprises examining a mask provided in a location designated by the instruction to determine the one or more external interruption subclasses to be tested, the mask including a plurality of indicators for a plurality of external interruption subclasses, and wherein an indicator of the plurality of indicators set to a defined value indicates that an external interruption subclass corresponding to the indicator is to be tested.

14. The computer system of claim 12, wherein the executing the instruction is performed regardless of whether a processor executing the instruction is enabled for interrupts.

15. The computer system of claim 12, wherein the executing further includes providing a summary indication indicating whether one or more external interruptions are pending for the one or more external interruption subclasses being tested.

16. A computer-implemented method of facilitating processing within a computing environment, said computer-implemented method comprising:
   obtaining an instruction to test for one or more pending external interrupts, wherein an external interrupt is an interrupt that originates from within a computer system, external to a program, and is distinct from an input/output (I/O) interrupt originating from an I/O device; and
   executing, by a processor, the instruction, the executing including:
      determining, based on information provided by the instruction, one or more external interruption subclasses to be tested;
      checking whether one or more external interruptions are pending for the one or more external interruption subclasses being tested; and
      indicating whether one or more external interruptions are pending for the one or more external interruption subclasses being tested.

17. The computer-implemented method of claim 16, wherein the determining comprises examining a mask provided in a location designated by the instruction to determine the one or more external interruption subclasses to be tested, the mask including a plurality of indicators for a plurality of external interruption subclasses, and wherein an indicator of the plurality of indicators set to a defined value indicates that an external interruption subclass corresponding to the indicator is to be tested.

18. The computer-implemented method of claim 16, wherein the indicating comprises setting, for an external interruption subclass having a pending external interruption, an indicator in a location specified by the instruction.

19. The computer-implemented method of claim 16, wherein the executing the instruction is performed regardless of whether the processor executing the instruction is enabled for interrupts.

20. The computer-implemented method of claim 16, wherein the executing further includes providing a summary indication indicating whether one or more external interruptions are pending for the one or more external interruption subclasses being tested.

* * * * *